(12) United States Patent
Yu

(10) Patent No.: US 12,032,427 B2
(45) Date of Patent: Jul. 9, 2024

(54) APPARATUS FOR OUTPUTTING SOUND SOURCE FOR MINIMIZING POWER CONSUMPTION AND OPERATING METHOD THEREOF

(71) Applicant: DREAMUS COMPANY, Seoul (KR)

(72) Inventor: Seung Ho Yu, Incheon (KR)

(73) Assignee: DREAMUS COMPANY, Seoul (KR)

( * ) Notice: Subject to any disclaimer, the term of this patent is extended or adjusted under 35 U.S.C. 154(b) by 92 days.

(21) Appl. No.: 17/895,686

(22) Filed: Aug. 25, 2022

(65) Prior Publication Data

US 2023/0066400 A1    Mar. 2, 2023

(30) Foreign Application Priority Data

Aug. 30, 2021    (KR) .......................... 10-2021-0115065

(51) Int. Cl.
  *G06F 1/3234*    (2019.01)
  *G06F 1/3215*    (2019.01)
  *G06F 3/16*      (2006.01)

(52) U.S. Cl.
  CPC ............ *G06F 1/325* (2013.01); *G06F 1/3215* (2013.01); *G06F 3/162* (2013.01)

(58) Field of Classification Search
  CPC ......... G06F 1/325; G06F 1/3215; G06F 3/162
  See application file for complete search history.

(56) References Cited

U.S. PATENT DOCUMENTS

| | | | | |
|---|---|---|---|---|
| 6,424,875 B1* | 7/2002 | Yoon | ..................... | H03G 3/348 |
| | | | | 345/211 |
| 6,473,078 B1* | 10/2002 | Ikonen | ................. | G06F 1/3218 |
| | | | | 348/378 |
| 2009/0316931 A1* | 12/2009 | Dai | .......................... | H04R 3/12 |
| | | | | 381/104 |
| 2017/0064455 A1* | 3/2017 | Asao | ...................... | H04R 5/033 |
| 2018/0367102 A1* | 12/2018 | Takemura | ............... | H03F 3/187 |

FOREIGN PATENT DOCUMENTS

| | | |
|---|---|---|
| JP | 2017-73830 A | 4/2017 |
| KR | 10-2015-0115309 A | 10/2015 |

* cited by examiner

*Primary Examiner* — Nimesh G Patel

(57) ABSTRACT

An apparatus for outputting a sound source for minimizing power consumption and an operating method thereof are disclosed. The sound source output method includes a terminal detecting step of detecting connection and a type of a terminal; a power control processing step of generating a power control signal so as to correspond to an audio transmitting method according to the detected terminal type and controlling a power supply operation to a conversion processing unit and an amplification processing unit connected to a power source unit including at least one power block based on the power control signal; an audio signal generating step of generating at least one audio signal by performing signal converting and amplifying operations based on the power supplied based on the power supply operation; and an audio outputting step of outputting a final audio signal generated using audio signals according to the audio transmitting method.

10 Claims, 5 Drawing Sheets

APPARATUS FOR OUTPUTTING SOUND SOURCE FOR MINIMIZING POWER CONSUMPTION AND OPERATING METHOD THEREOF

CROSS-REFERENCE TO RELATED APPLICATIONS

This application claims priority to and the benefit of Korean Patent Application No. 10-2021-0115065 filed in the Korean Intellectual Property Office on Aug. 30, 2021, the entire contents of which are incorporated herein by reference.

TECHNICAL FIELD

The present disclosure relates to an apparatus for outputting a sound source by minimizing power consumption and an operating method thereof.

BACKGROUND ART

The contents described in this section merely provide background information on the exemplary embodiment of the present disclosure, but do not constitute the related art. When a general sound source output apparatus applies a digital to analog converter (DAC) and an amplifier, a clearer and richer sound may be provided to users. When two DACs are used, the sound source output apparatus generates an L+ signal and an L− signal from one digital to analog converter and generates a R+ signal and a R− signal from the other digital analog converter and then creates a balanced signal using the signals first and the generated signal is switched to output an unbalanced signal. Therefore, both the digital to analog converter and the amplifier are used so that the power consumption is high.

In the meantime, when four digital to analog converters QAUD DAC are used to improve a sound quality of the sound source output apparatus, the sound source output apparatus uses four digital to analog converters to generate a L+ signal, a L− signal, a R+ signal, and a R− signal. As the signal is generated in each of the digital to analog converters, a purity of the audio signal is very high, but all the digital to analog converters and the amplifiers are used so that the power consumption is very high.

Accordingly, a technique is necessary to minimize the power consumption while using a large number of digital to analog converters and amplifiers in the sound source output device.

SUMMARY

A main object of the present disclosure is to provide a sound source output apparatus which controls the power supply of a DAC and an AMP according to an audio transmitting method to minimize the power consumption and an operating method thereof.

According to an aspect of the present invention, in order to achieve the above-described objects, a sound source output method includes: a terminal detecting step of detecting connection and a type of a terminal; a power control processing step of generating a power control signal so as to correspond to an audio transmitting method according to the detected terminal type and controlling a power supply operation to a conversion processing unit and an amplification processing unit connected to a power source unit including at least one power block based on the power control signal; an audio signal generating step of generating at least one audio signal by performing signal converting and amplifying operations based on the power supplied based on the power supply operation; and an audio outputting step of outputting a final audio signal generated using at least one audio signal according to the audio transmitting method.

Further, according to another aspect of the present disclosure, in order to achieve the above-described objects, a sound source output apparatus includes: a terminal detecting unit configured to detect connection and a type of a terminal; a power control unit configured to generate a power control signal so as to correspond to an audio transmitting method according to the detected terminal type and controlling a power supply operation to a conversion processing unit and an amplification processing unit connected to a power source unit including at least one power block based on the power control signal; an audio signal generating unit configured to generate at least one audio signal by performing signal converting and amplifying operations based on the power supplied based on the power supply operation; and an audio output unit configured to output a final audio signal generated using at least one audio signal according to the audio transmitting method.

As described above, according to the present disclosure, even though a large number of digital to analog converters and amplifiers are used, the power supply operation of the circuits is controlled according to an audio transmitting method so that the power consumption for outputting the audio signal may be minimized.

DETAILED DESCRIPTION OF THE EMBODIMENT

Hereinafter, exemplary embodiments of the present disclosure will be described in detail with reference to the accompanying drawings. In the description of the present disclosure, if it is considered that the specific description of related known configuration or function may cloud the gist of the present disclosure, the detailed description will be omitted. Further, hereinafter, exemplary embodiments of the present disclosure will be described. However, it should be understood that the technical spirit of the invention is not restricted or limited to the specific embodiments, but may be changed or modified in various ways by those skilled in the art to be carried out. Hereinafter, a sound source output apparatus for minimizing the power consumption proposed by the present disclosure and an operating method thereof will be described in more detail with reference to the drawings.

Figure 1:
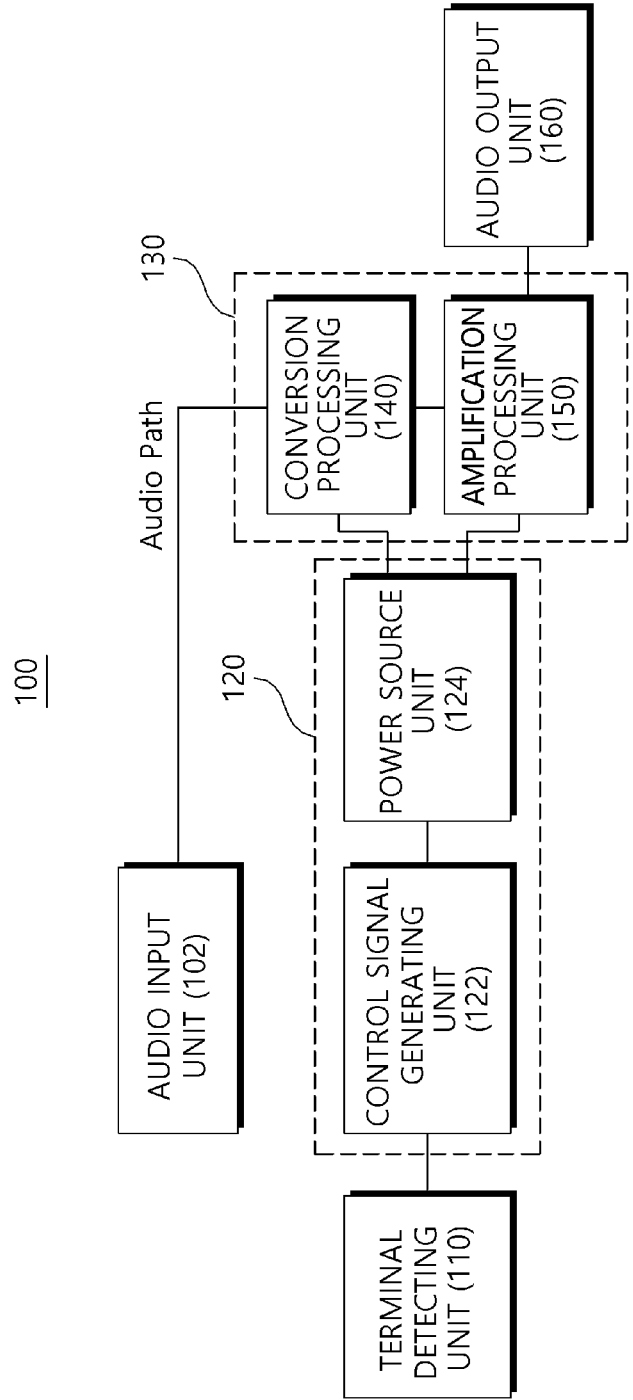
FIG. 1 is a block diagram schematically illustrating a sound source output apparatus for minimizing power consumption according to an exemplary embodiment of the present disclosure.

FIG. 1 is a block diagram schematically illustrating a sound source output apparatus for minimizing power consumption according to an exemplary embodiment of the present disclosure.

The sound source output apparatus 100 according to the exemplary embodiment includes an audio input unit 102, a terminal detecting unit 110, a power control unit 120, an audio signal generating unit 130, and an audio output unit 160. The sound source output apparatus 100 of FIG. 1 is an example so that all blocks illustrated in FIG. 1 are not essential components and in the other exemplary embodiment, some blocks included in the sound source output apparatus 100 may be added, modified, or omitted.

The sound source output apparatus 100 detects a terminal connection and a type and controls the power supply of the conversion processing unit for signal conversion according to an audio transmitting method according to the detected terminal type and the amplification processing unit for a signal amplifying operation. Thereafter, the sound source output apparatus 100 outputs a final audio signal using at least one audio signal generated by minimizing the used power by means of the power supply control. Hereinafter, components included in the sound source output apparatus 100 will be described.

The audio input unit 102 receives a sound source signal and transmits the input sound source signal to the audio signal generating unit 130. The audio input unit 102 transmits the sound source signal to a conversion processing unit 140 of the audio signal generating unit 130 through a sound source output path (an audio path). Here, the sound source signal is a digital discrete signal, but is not necessarily limited, and may be a digital signal related to the sound source.

The audio input unit 102 is connected to a separate device or module including a processor or a memory to receive data about a sound source signal, but is not necessarily limited thereto.

The terminal detecting unit 110 performs an operation of detecting a terminal to which an output jack is connected to the sound source output apparatus 100. The terminal detecting unit 110 detects the connection of the output jack to the input terminal equipped in the sound source output apparatus 100 and a type of the input terminal.

When the input terminal is connected to the output jack, the terminal detecting unit 110 detects a type of the input terminal for an audio transmitting method supported by the output jack. The terminal detecting unit 110 detects a type of terminal concerning whether to support a balanced audio transmitting method or an unbalanced audio transmitting method according to a type of the output jack connected to the input terminal. Here, the output jack may be a cable, TS/TRS, XLR cable, or RCA cable (phono plug), in which multiple pins such as two pins, three pins, four pins, or five pins are formed in 2.3 mm, 3.5 mm, and 4.4 mm, but is not necessarily limited thereto.

The power control unit 120 controls the power supply to the audio signal generating unit 130 based on an audio transmitting method according to the detected terminal type. Here, the power control unit 120 controls the power supply to the audio signal generating unit 130 so as to operate in an audio transmitting method according to the terminal type while minimizing the power consumption.

The power control unit 120 according to the exemplary embodiment includes a control signal generating unit 122 and a power source unit 124.

Specifically, the control signal generating unit 122 of the power control unit 120 generates a power control signal so as to correspond to the audio transmitting method according to the terminal type detected by the terminal detecting unit 110.

The power control unit 120 determines one of a balanced audio transmitting method and an unbalanced audio transmitting method based on the type of connected terminal and generates a power control signal to control the on/off of the power supply to at least one power block so as to correspond to the determined audio transmitting method. Here, the power control signal is a signal which is transmitted to all or some of at least one power block included in the power source unit 124 and refers to a control signal to enable the power block to the power to the conversion processing unit 140 and the amplification processing unit 150 connected to the power block.

Thereafter, the power control unit 120 controls a power supply operation to each of the conversion processing unit 140 and the amplification processing unit 150 which are connected to the power source unit 124 including at least one power block based on the power control signal.

Specifically, the power control unit 120 controls the power supply operation to some power blocks connected to at least one conversion processing unit 140 which converts the signal according to the audio transmitting method determined based on the power control signal and at least one amplification processing unit 150 which performs the amplification.

When the determined audio transmitting method is a balanced audio transmitting method, the power control unit 120 inputs a power control signal to a power block for transmitting a balanced audio among at least one power block. The power control unit 120 controls the power supply operation to enable the power supply to a conversion chip (DAC chip) for balancing included in at least one conversion processing unit 140 and an amplifier for balancing included in at least one amplification processing unit 150, which are connected to the power block for transmitting the balanced audio.

In the meantime, when the determined audio transmitting method is a unbalanced audio transmitting method, the power control unit 120 inputs a power control signal to a power block for transmitting a unbalanced audio among at least one power block. The power control unit 120 controls the power supply operation to enable the power supply to a conversion chip (DAC chip) for unbalance included in at least one conversion processing unit 140 and an amplifier for unbalance included in at least one amplification processing unit 150, which are connected to the power block for transmitting the unbalanced audio.

The audio signal generating unit 130 generates at least one audio signal by performing the signal converting and amplifying operation based on the power supplied based on the power supply operation.

The audio signal generating unit 130 includes the conversion processing unit 140 and the amplification processing unit 150.

The conversion processing unit 140 receives a sound source signal from the audio input unit 102 and performs an operation of converting a digital sound source signal into an analog signal.

The conversion processing unit 140 according to the exemplary embodiment is implemented to include a plurality of digital to analog converters (DAC).

For example, the conversion processing unit 140 may be implemented to include four digital to analog converters and each of four digital to analog converters performs an operation of generating two L+/L− analog signals and two R+/R− analog signals. Here, each of the digital to analog converters may be implemented to include a DAC chip for balancing and a DAC chip for unbalancing. The DAC chip for balancing refers to a DAC used for the balanced audio transmitting method and the DAC chip for unbalancing refers to a DAC used for the unbalanced audio transmitting method.

Each of the DAC chip for balancing and the DAC chip for unbalancing included in each of the digital to analog converters are connected to an amplifier for balancing and an amplifier for unbalancing included in the amplification processing unit 150.

The amplification processing unit 150 performs an operation of receiving and amplifying an analog signal output from the conversion processing unit 140.

The amplification processing unit 150 is implemented to include a plurality of amplifiers connected to each of the plurality of digital to analog converters.

For example, the amplification processing unit 150 may be implemented to include four amplifiers and each of four amplifiers performs an operation of generating a L+ signal, a L− signal, a R+ signal, and a R− signal. Here, each of the amplifiers may be implemented to include an amplifier for balancing and an amplifier for unbalancing. The amplifier for balancing refers to an amplifier used for a balanced audio transmitting method and the amplifier for unbalancing refers an amplifier used for an unbalanced audio transmitting method.

The amplifier for balancing included in each of the amplifiers according to the exemplary embodiment outputs a balanced L+ signal, a balanced L− signal, a balanced R+ signal, and a balanced R− signal which are amplified and the amplifier for unbalance included in each of the amplifiers according to the exemplary embodiment outputs a unbalanced L+ signal, a unbalanced L− signal, a unbalanced R+ signal, and a unbalanced R− signal which are amplified.

Hereinafter, an operation of the audio signal generating unit 130 for the balanced audio transmitting method will be explained.

The audio signal generating unit 130 generates a first audio signal, a second audio signal, a third audio signal, and a fourth audio signal using only a DAC chip for balancing included in each of at least one conversion processing unit 140 and an amplifier for balancing included in at least one amplification processing unit 150, to which the power is supplied. Here, the first audio signal is a balanced left phase signal and the second audio signal is a balanced left inverse phase signal. Further, the third audio signal is a balanced right phase signal and the fourth audio signal is a balanced right inverse phase signal.

Hereinafter, an operation of the audio signal generating unit 130 for the unbalanced audio transmitting method will be explained.

The audio signal generating unit 130 generates a 1-1st audio signal, a 2-1st audio signal, a 3-1st audio signal, and a 4-1st audio signal using only the DAC chip for unbalancing included in each of at least one conversion processing unit 140 and an amplifier for unbalancing included in at least one amplification processing unit 150, to which the power is supplied. Here, the 1-1st audio signal is a unbalanced left phase signal and the 2-1st audio signal is a unbalanced left inverse phase signal. Here, the 3-1st audio signal is a unbalanced right phase signal and the 4-1st audio signal is a unbalanced right inverse phase signal.

The audio output unit 160 outputs a final audio signal generated using at least one audio signal according to the audio transmitting method.

According to the balanced audio transmitting method, the audio output unit 160 outputs a final audio signal including a first audio signal Bal L+, a second audio signal Bal L−, a third audio signal Bal R+, and a fourth audio signal Bal R−.

In the meantime, according to the unbalanced audio transmitting method, the audio output unit 160 performs phase-inverting on the 2-1st audio signal Unbal L− to be added with the 1-1st audio signal Unbal L+ and performs phase-inverting on the 4-1st audio signal Unbal R− to be added with the 3-1st audio signal Unbal R+ so that a final audio signal from which the noise is removed is output.

Figure 2:
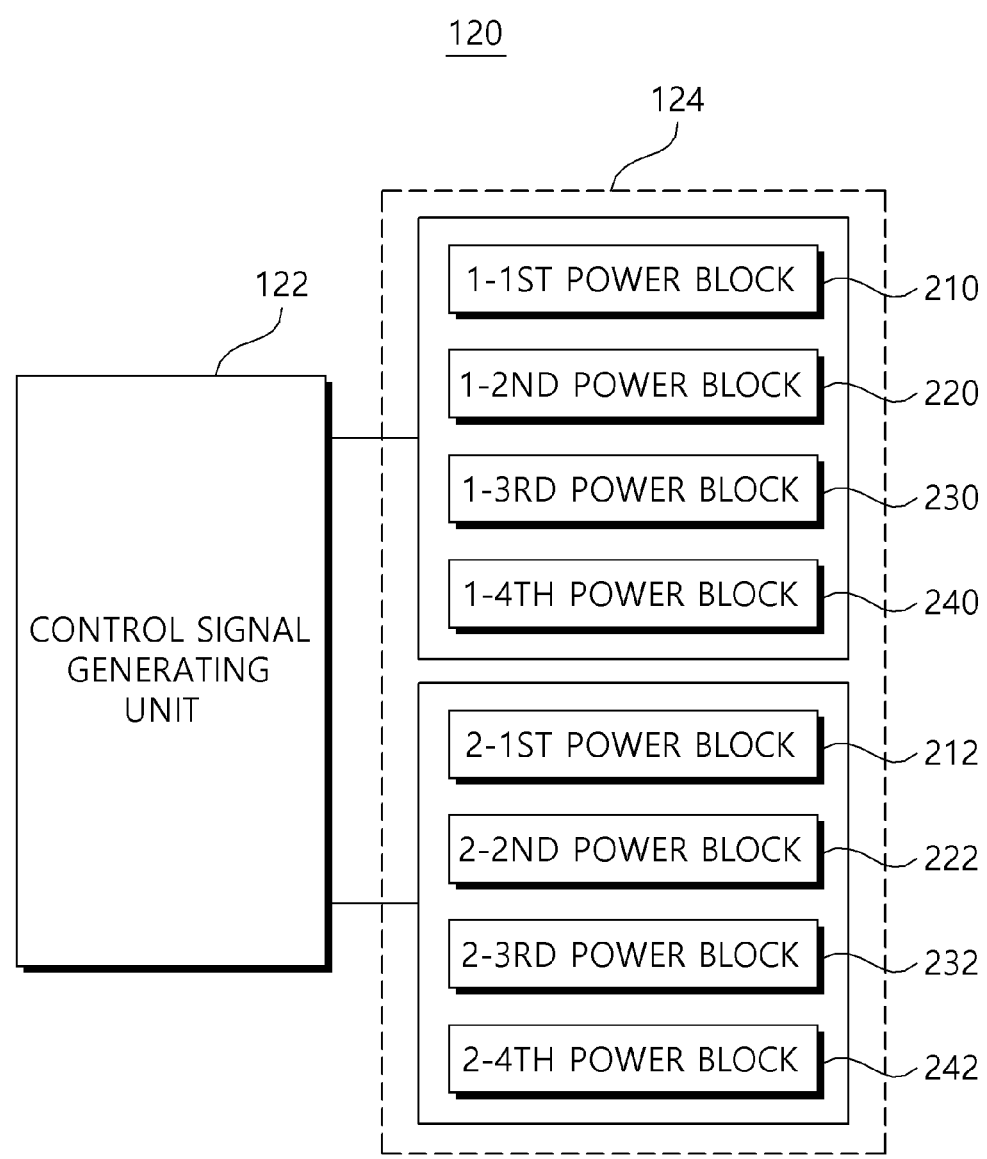
FIG. 2 is a block diagram illustrating a configuration of a power control unit for explaining a power control operation of a sound source output apparatus according to an exemplary embodiment of the present disclosure.

FIG. 2 is a block diagram illustrating a configuration of a power control unit for explaining a power control operation of a sound source output apparatus according to an exemplary embodiment of the present disclosure.

The power control unit 120 according to the exemplary embodiment controls the power supply based on an audio transmitting method according to the detected terminal type. The power control unit 120 includes a control signal generating unit 122 and a power source unit 124.

The control signal generating unit 122 generates a power control signal so as to correspond to an audio transmitting method according to the detected terminal type. The control signal generating unit 122 generates a power control signal so as to correspond to an audio transmitting method according to the detected terminal type.

The control signal generating unit 122 generates a first power control signal when the audio transmitting method according to the detected terminal type is a balanced audio transmitting method and generates a second power control signal when the audio transmitting method according to the detected terminal type is a unbalanced audio transmitting method. Here, the first power control signal refers to a control signal for enabling the power supply operation of power blocks 210, 220, 230, and 240 connected to the conversion chip (DAC chip) for balancing of the conversion processing unit 140 and the amplifier for balancing of the amplification processing unit 150 to operate as a balanced audio transmitting method. Further, the second power control signal refers to a control signal for enabling the power supply operation of power blocks 212, 222, 232, and 242 connected to the conversion chip (DAC chip) for unbalancing of the conversion processing unit 140 and the amplifier for unbalancing of the amplification processing unit 150 to operate as a unbalanced audio transmitting method.

The power source unit 124 according to the exemplary embodiment includes a plurality of power blocks connected to four conversion processing unit 140 and four amplification processing units 150.

A 1-1st power block 210, a 1-2nd power block 220, a 1-3rd power block 230, and a 1-4th power block 240 which re included in the power source unit 124 receive the first power control signal to supply the power according to the balanced audio transmitting method.

In the meantime, the 2-1st power block 212, the 2-2nd power block 222, the 2-3rd power block 232, and the 2-4th power block 242 included in the power source unit 124 receive the second power control signal to supply the power according to the unbalanced audio transmitting method.

Even though in FIG. 2, it is described that the power source unit 124 is connected to four conversion processing units 140 and four amplification processing units 150, it is not necessarily limited thereto and the number of conversion processing unit 140 and amplification processing unit 150 may vary depending on a hardware design of the audio transmitting method.

Figure 3:
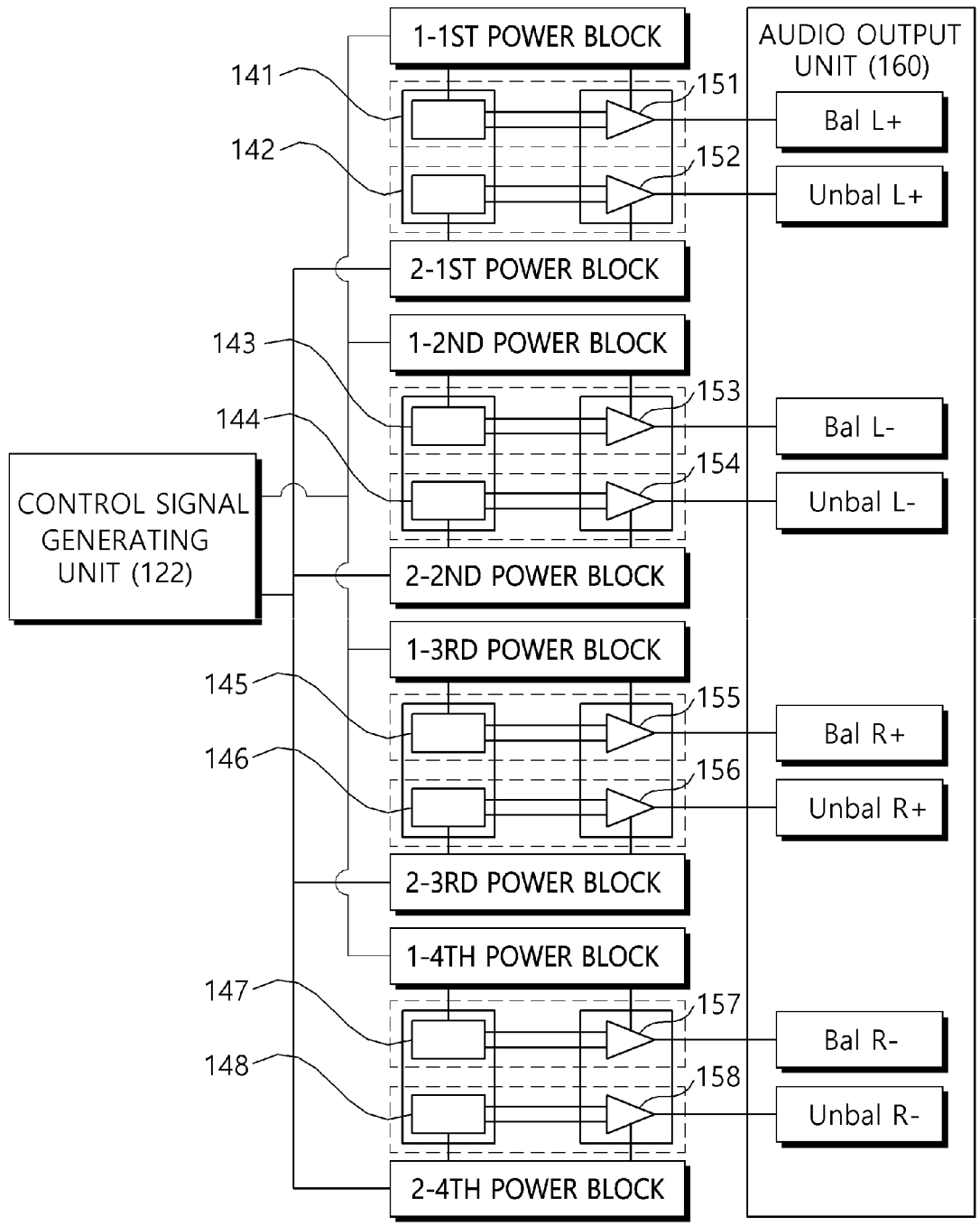
FIG. 3 is a block diagram specifically illustrating a power control operation of a sound source output apparatus according to an exemplary embodiment of the present disclosure.

FIG. 3 is a block diagram specifically illustrating a power control operation of a sound source output apparatus according to an exemplary embodiment of the present disclosure.

The conversion processing unit 140 according to the exemplary embodiment receives a sound source signal from the audio input unit 102 and performs an operation of converting a digital sound source signal into an analog signal. The conversion processing unit 140 according to the exemplary embodiment includes a plurality of digital to analog converters (DAC).

Referring to FIG. 3, the conversion processing unit 140 is implemented to include four digital to analog converters and four digital to analog converters include DAC chips 141, 143, 145, 147 for balancing and DAC chips 142, 144, 146, 148 for unbalancing, respectively.

The first DAC chip 141 for balancing and the second DAC chip 143 for balancing convert and output L+/L− analog signals and the third DAC chip 145 for balancing and the fourth DAC chip 147 for balancing convert and output R+/R− analog signals.

The first DAC chip 142 for unbalancing and the second DAC chip 144 for unbalancing convert and output L+/L− analog signals and the third DAC chip 146 for unbalancing and the fourth DAC chip 148 for unbalancing convert and output R+/R− analog signals.

The amplification processing unit 150 according to the exemplary embodiment performs an operation of receiving and amplifying an analog signal output from the conversion processing unit 140. The amplification processing unit 150 according to the exemplary embodiment includes a plurality of amplifiers connected to the plurality of digital to analog converters.

Referring to FIG. 3, the amplification processing unit 150 may be implemented to include four amplifiers and four amplifier includes amplifiers 151, 153, 155, 157 for balancing and amplifiers 152, 154, 156, 158 for unbalancing.

The first amplifier 151 for balancing is connected to the first DAC chip 141 for balancing and receives and amplifies the L+/L− analog signals from the first DAC chip 141 for balancing to output a balanced L+ signal. The second amplifier 153 for balancing is connected to the second DAC chip 143 for balancing and receives and amplifies the L+/L− analog signals from the second DAC chip 143 for balancing to output a balanced L− signal. The third amplifier 155 for balancing is connected to the third DAC chip 145 for balancing and receives and amplifies the R+/R− analog signals from the third DAC chip 145 for balancing to output a balanced R+ signal. The fourth amplifier 157 for balancing is connected to the fourth DAC chip 147 for balancing and receives and amplifies the R+/R− analog signals from the fourth DAC chip 147 for balancing to output a balanced R− signal.

The first amplifier 152 for unbalancing is connected to the first DAC chip 142 for unbalancing and receives and amplifies the L+/L− analog signals from the first DAC chip 142 for unbalancing to output a unbalanced L+ signal. The second amplifier 154 for unbalancing is connected to the second DAC chip 144 for unbalancing and receives and amplifies the L+/L− analog signals from the second DAC chip 144 for unbalancing to output a unbalanced L− signal. The third amplifier 156 for unbalancing is connected to the third DAC chip 146 for unbalancing and receives and amplifies the R+/R− analog signals from the third DAC chip 146 for unbalancing to output a unbalanced R+ signal. The fourth amplifier 158 for unbalancing is connected to the fourth DAC chip 148 for unbalancing and receives and amplifies the R+/R− analog signals from the fourth DAC chip 148 for unbalancing to output a unbalanced R− signal.

Hereinafter, an operation of controlling a power and generating an audio signal to operate as a balanced audio transmitting method in a sound source output apparatus 100 will be described with reference to FIG. 3.

The control signal generating unit 122 transmits the first power control signal to a 1-1st power block 210, a 1-2nd power block 220, a 1-3rd power block 230, and a 1-4th power block 240.

The 1-1st power block 210 enables the power supply operation to the first DAC chip 141 for balancing and the first amplifier 151 for balancing according to the first power control signal. The first DAC chip 141 for balancing and the first amplifier 151 for balancing perform signal converting and amplifying operations to output the balanced L+ signal.

The 1-2nd power block 220 enables the power supply operation to the second DAC chip 143 for balancing and the second amplifier 153 for balancing according to the first power control signal. The second DAC chip 143 for balancing and the second amplifier 153 for balancing perform signal converting and amplifying operations to output the balanced L− signal.

The 1-3rd power block 230 enables the power supply operation to the third DAC chip 145 for balancing and the third amplifier 155 for balancing according to the first power control signal. The third DAC chip 145 for balancing and the third amplifier 155 for balancing perform signal converting and amplifying operations to output the balanced R+ signal.

The 1-4th power block 240 enables the power supply operation to the fourth DAC chip 147 for balancing and the fourth amplifier 157 for balancing according to the first power control signal. The fourth DAC chip 147 for balancing and the fourth amplifier 157 for balancing perform signal converting and amplifying operations to output the balanced R− signal. The audio output unit 160 outputs a final audio signal based on the balanced audio transmitting method using the balanced L+ signal, the balanced L− signal, the balanced R+ signal, and the balanced R− signal.

Hereinafter, an operation of controlling a power and generating an audio signal to operate as a unbalanced audio transmitting method in a sound source output apparatus 100 will be described with reference to FIG. 3.

The control signal generator 122 transmits the second power control signal to a 2-1st power block 212, a 2-2nd power block 222, a 2-3rd power block 232, and a 2-4th power block 242. The 2-1st power block 212 enables the power supply operation to the first DAC chip 142 for unbalancing and the first amplifier 152 for unbalancing according to the second power control signal. The first DAC chip 142 for unbalancing and the first amplifier 152 for unbalancing perform signal converting and amplifying operations to output the unbalanced L+ signal.

The 2-2nd power block 222 enables the power supply operation to the second DAC chip 144 for unbalancing and the second amplifier 154 for unbalancing according to the second power control signal. The second DAC chip 144 for unbalancing and the second amplifier 154 for unbalancing perform signal converting and amplifying operations to output the unbalanced L− signal.

The 2-3rd power block 232 enables the power supply operation to the third DAC chip 146 for unbalancing and the third amplifier 156 for unbalancing according to the second power control signal. The third DAC chip 146 for unbalancing and the third amplifier 156 for unbalancing perform signal converting and amplifying operations to output the unbalanced R+ signal.

The 2-4th power block 242 enables the power supply operation to the fourth DAC chip 148 for unbalancing and the fourth amplifier 158 for unbalancing according to the second power control signal. The fourth DAC chip 148 for unbalancing and the fourth amplifier 158 for unbalancing perform signal converting and amplifying operations to output the unbalanced R− signal.

The audio output unit 160 outputs a final audio signal based on the unbalanced audio transmitting method using the unbalanced L+ signal, the unbalanced L− signal, the unbalanced R+ signal, and the unbalanced R− signal.

Figure 4:
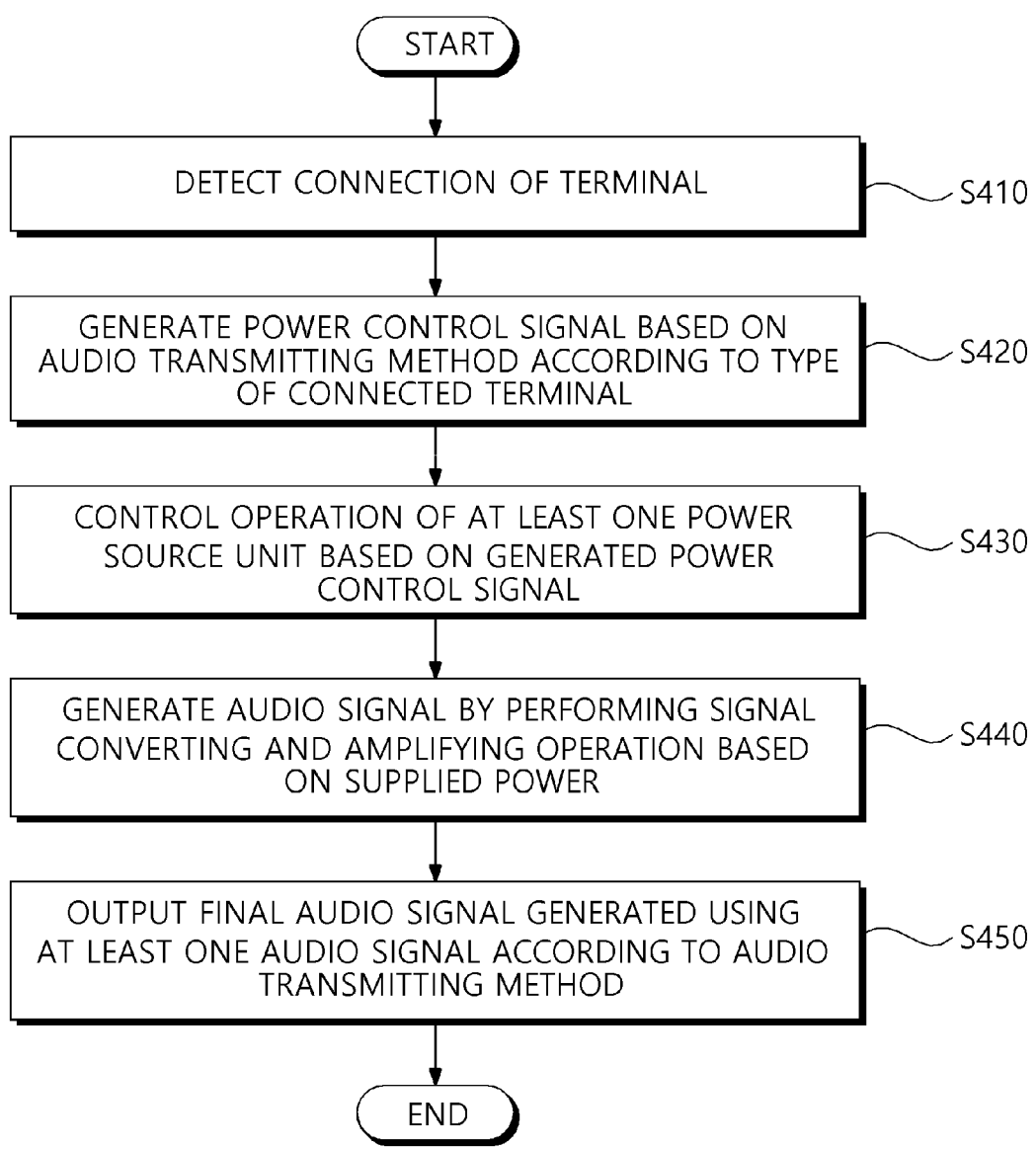
FIGS. 4 and 5 are flowcharts for explaining a sound source output method for minimizing power consumption according to an exemplary embodiment of the present disclosure.
Figure 5:
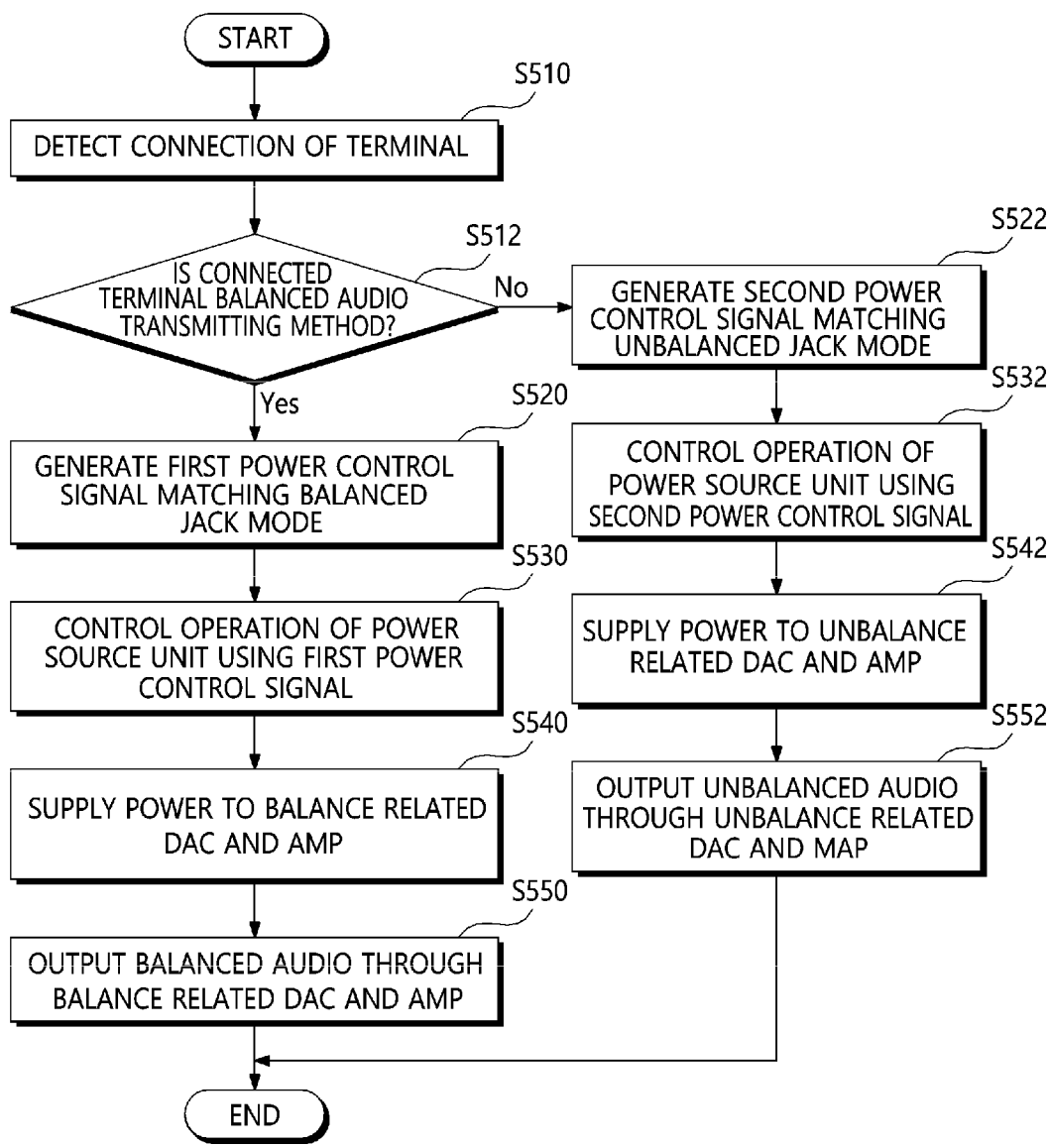

FIGS. 4 and 5 are flowcharts for explaining a sound source output method for minimizing power consumption according to an exemplary embodiment of the present disclosure.

FIG. 4 is a flowchart schematically illustrating a sound source output method for minimizing power consumption.

The sound source output apparatus 100 performs an operation of detecting a terminal to which the output jack is connected in step S410. The sound source output apparatus 100 detects the connection of the output jack to the input terminal equipped in the sound source output apparatus 100 and a type of the input terminal. When the input terminal is connected to the output jack, the sound source output apparatus 100 detects a type of the input terminal for an audio transmitting method supported by the output jack. Here, the sound source output apparatus 100 detects a type of terminal concerning whether to support a balanced audio transmitting method or an unbalanced audio transmitting method according to a type of the output jack connected to the input terminal.

The sound source output apparatus 100 generates a power control signal so as to correspond to an audio transmitting method according to the detected terminal type in step S420 and controls a power supply operation of the power source unit which includes at least one power block based on the power control signal in step S430.

The sound source output apparatus 100 determines one of a balanced audio transmitting method and an unbalanced audio transmitting method based on the type of connected terminal and generates a power control signal to control the on/off of the power supply to at least one power block so as to correspond to the determined audio transmitting method. Thereafter, the sound source output apparatus 100 controls the power source supplying operation to some power blocks connected to at least one conversion processing unit 140 which converts the signal according to the audio transmitting method determined based on the power control signal and at least one amplification processing unit 150 which performs the amplifying operation.

The sound source output apparatus 100 performs the signal converting and amplifying operations based on the supplied power to generate at least one audio signal in step S440. According to the balanced audio transmitting method, the sound source output apparatus 100 generates a first audio signal, a second audio signal, a third audio signal, and a fourth audio signal using only a DAC chip for balancing included in each of at least one conversion processing unit 140 and an amplifier for balancing included in at least one amplification processing unit 150, to which the power is supplied.

In the meantime, according to the unbalanced audio transmitting method, the sound source output apparatus 100 generates a 1-1st audio signal, a 1-2nd audio signal, a 1-3rd audio signal, and a 1-4th audio signal using only a DAC chip for unbalancing included in each of at least one conversion processing unit 140 and an amplifier for unbalancing included in at least one amplification processing unit 150, to which the power is supplied.

The sound source output apparatus 100 generates and outputs a final audio signal using at least one audio signal according to the audio transmitting method in step S450.

According to the balanced audio transmitting method, the sound source output apparatus 100 outputs a final audio signal including a first audio signal Bal L+, a second audio signal Bal L−, a third audio signal Bal R+, and a fourth audio signal Bal R−.

In the meantime, according to the unbalanced audio transmitting method, the sound source output apparatus 100 performs phase-inverting on the 2-1st audio signal Unbal L− to be added with the 1-1st audio signal Unbal L+ and performs phase-inverting on the 4-1st audio signal Unbal R− to be added with the 3-1st audio signal Unbal R+ so that a final audio signal from which the noise is removed is output.

FIG. 5 is a flowchart specifically illustrating a sound source output method for minimizing power consumption.

The sound source output apparatus 100 performs an operation of detecting a terminal to which the output jack is connected in step S510. The sound source output apparatus 100 detects the connection of the output jack to the input terminal equipped in the sound source output apparatus 100 and a type of the input terminal. When the input terminal is connected to the output jack, the terminal detecting unit 100 detects a type of the input terminal for an audio transmitting method supported by the output jack. Here, the sound source output apparatus 100 detects a type of terminal concerning whether to support a balanced audio transmitting method or an unbalance audio transmitting method according to a type of the output jack connected to the input terminal.

The sound source output apparatus 100 checks whether the audio transmitting method according to the connected terminal type is a balanced audio transmitting method in step S512.

As the checking result of step S512, if the audio transmitting method according to the connected terminal type is a balanced audio transmitting method, the sound source output apparatus 100 generates a first power control signal to control the power supply for each of the power block for balancing to be on so as to correspond to the balanced audio transmitting method in step S520. Here, the first power control signal refers to a control signal for enabling the power supply operation of power blocks 210, 220, 230, and 240 connected to the conversion chip (DAC chip) for balancing of the conversion processing unit 140 and the amplifier for balancing of the amplification processing unit 150 to operate as a balanced audio transmitting method.

The sound source output apparatus 100 inputs the first power control signal to the power block for balancing to control the operation of the power source unit 124 in step S530. The sound source output apparatus 100 transmits the first power control signal to the 1-1st power block 210, the 1-2nd power block 220, the 1-3rd power block 230, and the 1-4th power block 240 to supply the power according to the balanced audio transmitting method.

The sound source output apparatus 100 supplies power to the conversion chip for balancing included in at least one conversion processing unit and the amplifier for balancing included in at least one amplification processing unit which are connected to the power block for transmitting a balanced audio to enable the power supply in step S540.

In the power source output apparatus 100, the 1-1st power block 210 enables the power supply operation to the first DAC chip 141 for balancing and the first amplifier 151 for balancing according to the first power control signal and the 1-2nd power block 220 enables the power supply operation to the second DAC chip 143 for balancing and the second amplifier 153 for balancing according to the first power control signal. Further, the 1-3rd power block 230 enables the power supply operation to the third DAC chip 145 for balancing and the third amplifier 155 for balancing according to the first power control signal and the 1-4th power block 240 enables the power supply operation to the fourth DAC chip 147 for balancing and the fourth amplifier 157 for balancing according to the first power control signal.

In the meantime, when a plurality of conversion processing units is connected to one power block, the sound source output apparatus 100 selects a specific conversion processing unit based on a performance condition of the conversion chip for balancing included in each of the plurality of conversion processing units or a priority condition for every predetermined conversion chip for balancing to supply the power.

For example, when a plurality of conversion processing units is connected to one power block, the sound output apparatus 100 checks the performance condition (for example, a previously evaluated conversion performance) for each conversion chip for balancing included in each of the plurality of conversion processing units to calculate a first score and calculate a second score for a selection frequency (for example, a using frequency within a predetermined period) for each of the plurality of conversion processing units and then add the first score and second score to calculate a sum score of each of the plurality of conversion processing units and selects a conversion processing unit having the highest sum score among the plurality of conversion processing units as a specific conversion processing unit.

When there is a plurality of conversion processing units having the highest sum score, the sound source output apparatus 100 may select a specific conversion processing unit by additionally applying a priority. For example, the sound source output apparatus 100 checks a weight set for a priority set to each of the conversion chips for balancing included in each of the plurality of conversion processing units having the highest sum score and multiplies the checked weight to the sum score obtained by adding the first score and the second score to calculate a final sum score. Thereafter, the sound source output apparatus 100 selects a conversion processing unit having the highest final sum score among the plurality of conversion processing units having the highest sum score as a specific conversion processing unit to supply the power thereto.

The sound source output apparatus 100 generates a first audio signal, a second audio signal, a third audio signal, and a fourth audio signal using only a DAC chip for balancing included in each of at least one conversion processing unit and an amplifier for balancing included in at least one amplification processing unit, to which the power is supplied, to output a final audio signal for the balanced audio transmitting method in step S550.

The sound source output apparatus 100 performs the signal converting and amplifying operations in the first DAC chip 141 for balancing and the first amplifier 151 for balancing to output a first audio signal (balanced L+ signal) and performs the signal converting and amplifying operations in the second DAC chip 143 for balancing and the second amplifier 153 for balancing to output a second audio signal (balanced L− signal). Further, the sound source output apparatus 100 performs the signal converting and amplifying operations in the third DAC chip 145 for balancing and the third amplifier 155 for balancing to output a third audio signal (balanced R+ signal) and performs the signal converting and amplifying operations in the fourth DAC chip 147 for balancing and the fourth amplifier 157 for balancing to output a fourth audio signal (balanced R− signal).

Thereafter, the sound source output apparatus 100 outputs a final audio signal for the balanced audio transmitting method using the first audio signal, the second audio signal, the third audio signal, and the fourth audio signal.

As the checking result of step S512, if the audio transmitting method according to the connected terminal type is a unbalanced audio transmitting method, the sound source output apparatus 100 generates a second power control signal to control the power supply for each of the power block for unbalancing to be on so as to correspond to the unbalanced audio transmitting method in step S522. Here, the second power control signal refers to a control signal for enabling the power supply operation of power blocks 212, 222, 232, and 242 connected to the conversion chip (DAC chip) for unbalancing of the conversion processing unit 140 and the amplifier for unbalancing of the amplification processing unit 150 to operate as a unbalanced audio transmitting method.

The sound source output apparatus 100 inputs the second power control signal to the power block for unbalancing to control the operation of the power source unit 124 in step S532. The sound source output apparatus 100 transmits the second power control signal to the 2-1st power block 212, the 2-2nd power block 222, the 2-3rd power block 232, and the 2-4th power block 242 included in the power source unit 124 to supply the power according to the unbalanced audio transmitting method.

The sound source output apparatus 100 supplies power to the conversion chip for unbalancing included in at least one conversion processing unit and the amplifier for unbalancing included in at least one amplification processing unit which are connected to the power block for transmitting a unbalanced audio to enable the power supply in step S542.

In the power source output apparatus 100, the 2-1st power block 212 enables the power supply operation to the first DAC chip 142 for unbalancing and the first amplifier 152 for unbalancing according to the second power control signal and the 2-2nd power block 222 enables the power supply operation to the second DAC chip 144 for unbalancing and the second amplifier 154 for unbalancing according to the second power control signal. Further, the 2-3rd power block 232 enables the power supply operation to the third DAC chip 146 for unbalancing and the third amplifier 156 for unbalancing according to the second power control signal and the 2-4th power block 242 enables the power supply operation to the fourth DAC chip 148 for unbalancing and the fourth amplifier 158 for unbalancing according to the second power control signal.

In the meantime, when a plurality of conversion processing units is connected to one power block, the sound source output apparatus 100 selects a specific conversion processing unit based on a performance condition of the conversion chip for unbalancing included in each of the plurality of conversion processing units and a priority condition for every predetermined conversion chip for unbalancing to supply the power.

For example, when a plurality of conversion processing units is connected to one power block, the sound source output apparatus 100 checks a performance condition (for example, a previously evaluated conversion performance) for each of conversion chips for unbalancing included in each of the plurality of conversion processing units to calculate a first score and calculate a second score for the selection frequency (for example, a using frequency within a predetermined period) for each of the plurality of conversion processing units, and then adds the first score and the score to calculate a sum score of each of the plurality of conversion processing units and select a conversion processing unit having the highest score among the plurality of converters as a specific conversion processing unit.

When there is a plurality of conversion processing units having the highest sum score, the sound source output apparatus 100 may select a specific conversion processing unit by additionally applying a priority. For example, the sound source output apparatus 100 checks a weight set for a priority set to each of the conversion chips for unbalancing included in each of the plurality of conversion processing units having the highest sum score and multiplies the checked weight to the sum score obtained by adding the first score and the second score to calculate a final sum score. Thereafter, the sound source output apparatus 100 selects a conversion processing unit having the highest sum score among the plurality of plurality of conversion processing units having the highest sum score as a specific conversion processing unit to supply the power thereto.

The sound source output apparatus 100 generates a 1-1st audio signal, a 2-1st audio signal, a 3-1st audio signal, and a 4-1st audio signal using only the DAC chip for unbalancing included in each of at least one conversion processing unit and an amplifier for unbalance included in at least one amplification processing unit, to which the power is supplied, to output a final audio signal for the unbalanced audio transmitting method in step S552.

The sound source output apparatus 100 performs the signal converting and amplifying operations in the first DAC chip 142 for unbalancing and the first amplifier 152 for unbalancing to output a 1-1st audio signal (unbalanced L+ signal) and performs the signal converting and amplifying operations in the second DAC chip 144 for unbalancing and the second amplifier 154 for unbalancing to output a 2-1st audio signal (unbalanced L− signal). Further, the sound source output apparatus 100 performs the signal converting and amplifying operations in the third DAC chip 146 for unbalancing and the third amplifier 156 for unbalancing to output a 3-1st audio signal (unbalanced R+ signal) and performs the signal converting and amplifying operations in the fourth DAC chip 148 for unbalancing and the fourth amplifier 158 for unbalancing to output a 4-1st audio signal (unbalanced R− signal).

Thereafter, the sound source output apparatus 100 outputs a final audio signal for the unbalanced audio transmitting method using the 1-1st audio signal, the 2-1st audio signal, the 3-1st audio signal, and the 4-1st audio signal.

Even though in each of FIGS. 4 and 5, it is described that the steps are sequentially executed, the present disclosure is not necessarily limited thereto. In other words, the steps described in FIGS. 4 and 5 may be modified to be executed or one or more steps may be executed in parallel so that FIGS. 4 and 5 are not limited to a time-sequential order.

The sound source output method for minimizing power consumption according to the exemplary embodiment described in FIGS. 4 and 5 may be implemented by an application (or a program) and may be recorded in a terminal (or computer) readable recording media. The recording medium which has the application (or program) for implementing the sound source output method for minimizing power consumption according to the exemplary embodiment recorded therein and is readable by the terminal device (or a computer) includes all kinds of recording devices or media in which computing system readable data is stored.

It will be appreciated that various exemplary embodiments of the present disclosure have been described herein for purposes of illustration, and that various modifications and changes may be made by those skilled in the art without departing from the scope and spirit of the present disclosure.

Accordingly, the exemplary embodiments of the present disclosure are not intended to limit but describe the technical spirit of the present invention and the scope of the technical spirit of the present invention is not restricted by the exemplary embodiments. The protective scope of the embodiment of the present disclosure should be construed based on the following claims, and all the technical concepts in the equivalent scope thereof should be construed as falling within the scope of the embodiment of the present disclosure.

What is claimed is:

1. A method for outputting a sound source by minimizing power consumption in a sound source output apparatus, the method comprising:

a terminal detecting step of detecting connection and a type of a terminal;

a power control processing step of generating a power control signal so as to correspond to an audio transmitting method according to the detected terminal type and controlling a power supply operation to a conversion processing unit and an amplification processing unit connected to a power source unit including at least one power block based on the power control signal;

an audio signal generating step of generating at least one audio signal by performing signal converting and amplifying operations based on the power supplied based on the power supply operation; and an audio outputting step of outputting a final audio signal generated using at least one audio signal according to the audio transmitting method, wherein in the power control processing step, one of a balanced audio transmitting method and an unbalanced audio transmitting method is determined based on the type of connected terminal and a power control signal to control the on/off of the power supply to at least one power block is generated so as to correspond to the determined audio transmitting method, wherein in the power control processing step, a power supply operation to some power blocks connected to at least one conversion processing unit which performs the signal conversion and at least one amplification processing unit which performs an amplifying operation are controlled according to an audio transmitting method determined based on the power control signal, and wherein in the power control processing step, when a plurality of conversion processing units is connected to one power block, a specific conversion processing unit is selected based on a performance condition of the conversion chip for balancing included in each of the plurality of conversion processing units or a priority condition for every predetermined conversion chip for balancing, and power is supplied to the selected specific conversion processing unit.

2. The method for outputting a sound source according to claim 1, wherein in the power control processing step, when the determined audio transmitting method is a balanced audio transmitting method, a power control signal is input to a power block for transmitting a balanced audio among at least one power block and a power supply operation is controlled to enable the power supply to a conversion chip for balancing included in the at least one conversion processing unit and the amplifier for balancing included in at least one amplification processing unit, which are connected to the power block for transmitting a balanced audio.

3. The method for outputting a sound source according to claim 2, wherein in the audio signal generating step, a first audio signal, a second audio signal, a third audio signal, and a fourth audio signal are generated using only a DAC chip for balancing included in each of at least one conversion processing unit and an amplifier for balancing included in at least one amplification processing unit, to which the power is supplied, and the first audio signal is left phase signal, the second audio signal is a left inverse phase signal, the third audio signal is a right phase signal, and the fourth audio signal is a right inverse phase signal.

4. The method for outputting a sound source according to claim 3, wherein in the audio outputting step, a final audio signal including the first audio signal, the second audio signal, the third audio signal, and the fourth audio signal is output.

5. The method for outputting a sound source according to claim 1, wherein in the power control processing step, when the determined audio transmitting method is a balanced audio transmitting method, a power control signal is input to a power block for transmitting a balanced audio among at least one power block and a power supply operation is controlled to enable the power supply to a conversion chip for unbalancing included in the at least one conversion processing unit and the amplifier for unbalancing included in at least one amplification processing unit, which are connected to the power block for transmitting a unbalanced audio.

6. The method for outputting a sound source according to claim 5, wherein in the audio signal generating step, a 1-1st audio signal, a 2-1st audio signal, a 3-1st audio signal, and a 4-1st audio signal are generated using only a DAC chip for unbalancing included in each of at least one conversion processing unit and an amplifier for unbalancing included in at least one amplification processing unit, to which the power is supplied, and the 1-1 st audio signal is left phase signal, the 2-1st audio signal is a left inverse phase signal, the 3-1st audio signal is a right phase signal, and the 4-1st audio signal is a right inverse phase signal.

7. The method for outputting a sound source according to claim 6, wherein in the audio outputting step, the 2-1st audio signal is subjected to inverting phase processing to be added with the 1-1st audio and the 4-1st audio signal is subjected to inverting phase processing to be added with the 3-1st audio to output the final audio signal from which a noise is removed.

8. An apparatus for outputting a sound source by minimizing power consumption, the apparatus comprising:
- a terminal detecting unit configured to detect connection and a type of a terminal;
- a power control unit configured to generate a power control signal so as to correspond to an audio transmitting method according to the detected terminal type and controlling a power supply operation to a conversion processing unit and an amplification processing unit connected to a power source unit including at least one power block based on the power control signal;
- an audio signal generating unit configured to generate at least one audio signal by performing signal converting and amplifying operations based on the power supplied based on the power supply operation; and
- an audio output unit configured to output a final audio signal generated using at least one audio signal according to the audio transmitting method, wherein the power control processing unit determines one of a balanced audio transmitting method and an unbalanced audio transmitting method based on the type of connected terminal and generates a power control signal to control the on/off of the power supply to at least one power block so as to correspond to the determined audio transmitting method, wherein the power control processing unit controls a power supply operation to some power blocks connected to at least one conversion processing unit which performs the signal conversion and at least one amplification processing unit which performs an amplifying operation according to an audio transmitting method determined based on the power control signal, and wherein when a plurality of conversion processing units is connected to one power block, the power control processing unit selects a specific conversion processing unit based on a performance condition of the conversion chip for balancing included in each of the plurality of conversion processing units or a priority condition for every predetermined conversion chip for balancing, and supplies power to the selected specific conversion processing unit.

9. The apparatus for outputting a sound source according to claim 8, wherein the power control processing unit when the determined audio transmitting method is a balanced audio transmitting method, inputs a power control signal to a power block for transmitting a balanced audio among at least one power block and controls a power supply operation to enable the power supply to a conversion chip for balancing included in the at least one conversion processing unit connected to the power block for transmitting a balanced audio and the amplification processing unit for balancing included in at least one amplification processing unit.

10. The apparatus for outputting a sound source according to claim 8, wherein the power control processing unit when the determined audio transmitting method is a balanced audio transmitting method, inputs a power control signal to a power block for transmitting a balanced audio among at least one power block and controls a power supply operation to enable the power supply to a conversion chip for unbalancing included in the at least one conversion processing unit and the amplifier for unbalancing included in at least one amplification processing unit which are connected to the power block for transmitting a unbalanced audio.

\* \* \* \* \*